Feb. 21, 1956  R. W. BOYD ET AL  2,735,164
MACHINE FOR REMOVING SPACERS FROM RADIATOR CORES
Filed Sept. 29, 1951  6 Sheets-Sheet 1

Inventors.
Roy W. Boyd
August Van Vooren
Harold Ruehl
Paul O. Pippel
Atty.

Feb. 21, 1956    R. W. BOYD ET AL    2,735,164
MACHINE FOR REMOVING SPACERS FROM RADIATOR CORES
Filed Sept. 29, 1951    6 Sheets-Sheet 2
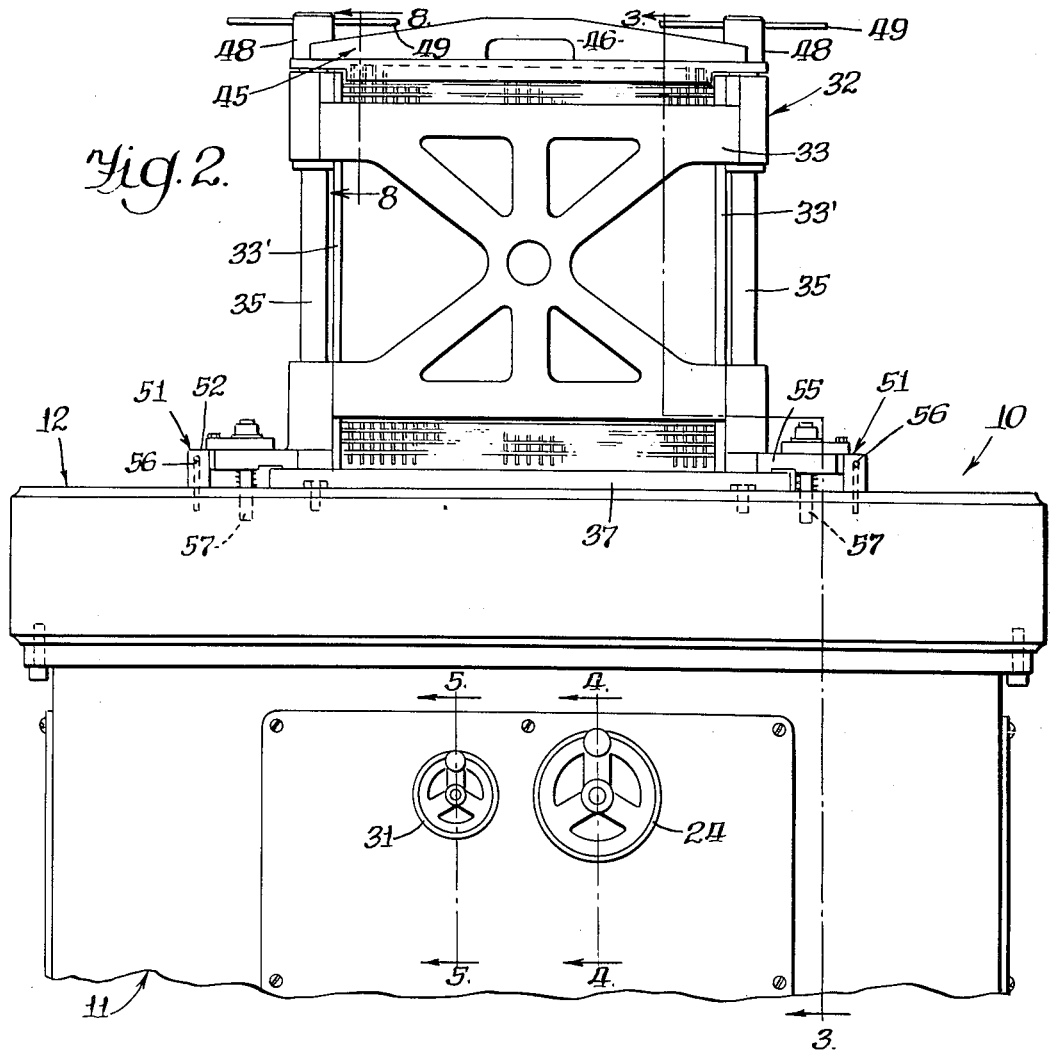
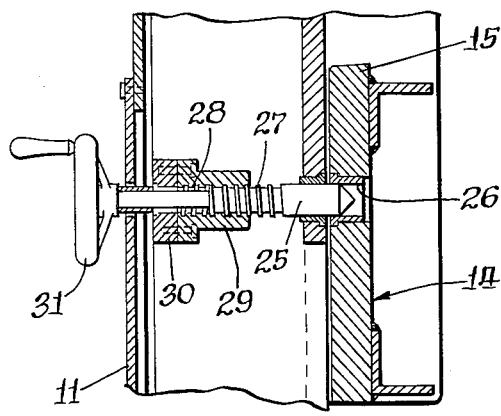
Inventors.
Roy W. Boyd
August Van Vooren
Harold Ruehl
Paul O. Rippel
Atty.

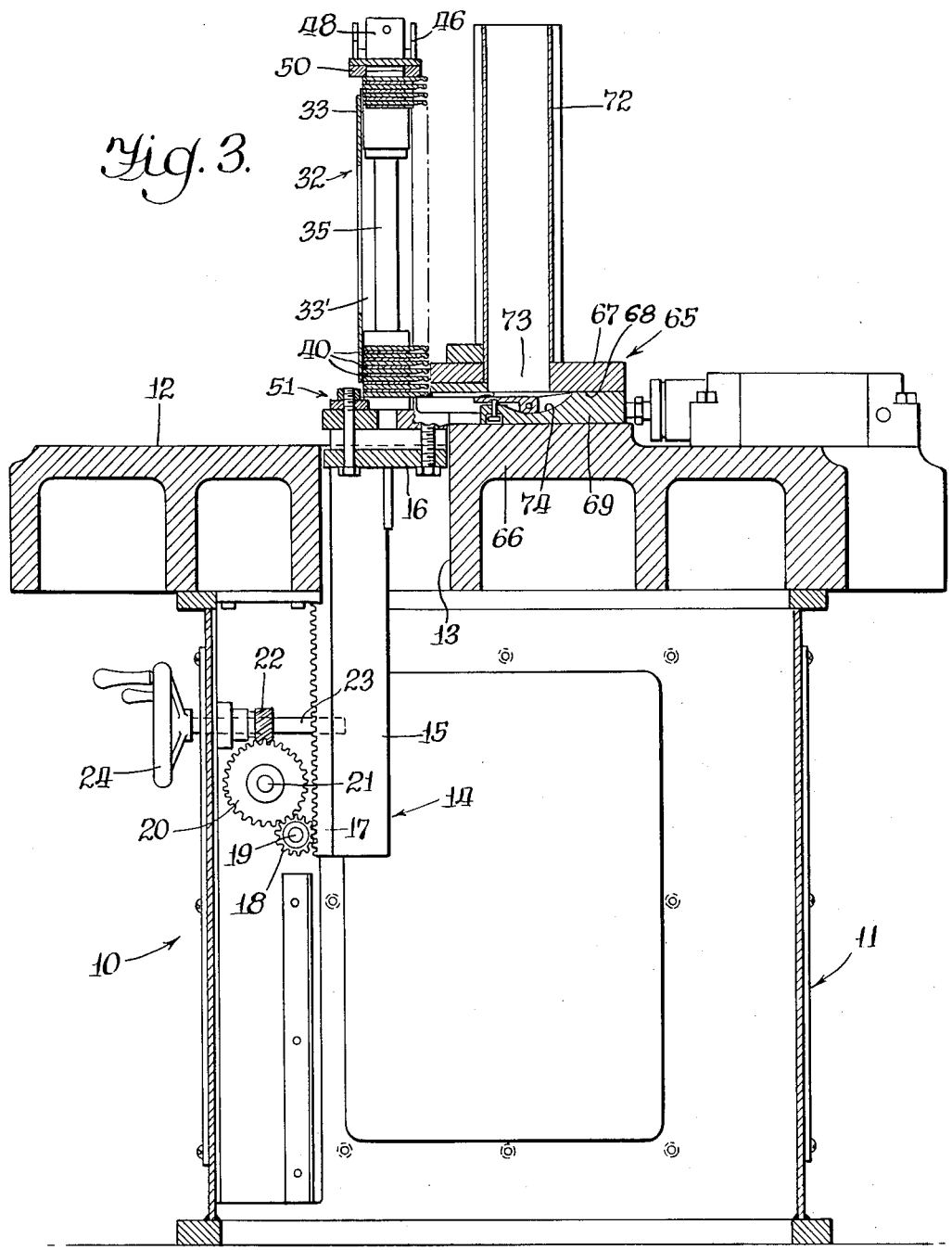

Inventors.
Roy W. Boyd
August Van Vooren
Harold Ruehl

Atty.

Feb. 21, 1956  R. W. BOYD ET AL  2,735,164
MACHINE FOR REMOVING SPACERS FROM RADIATOR CORES
Filed Sept. 29, 1951  6 Sheets-Sheet 5
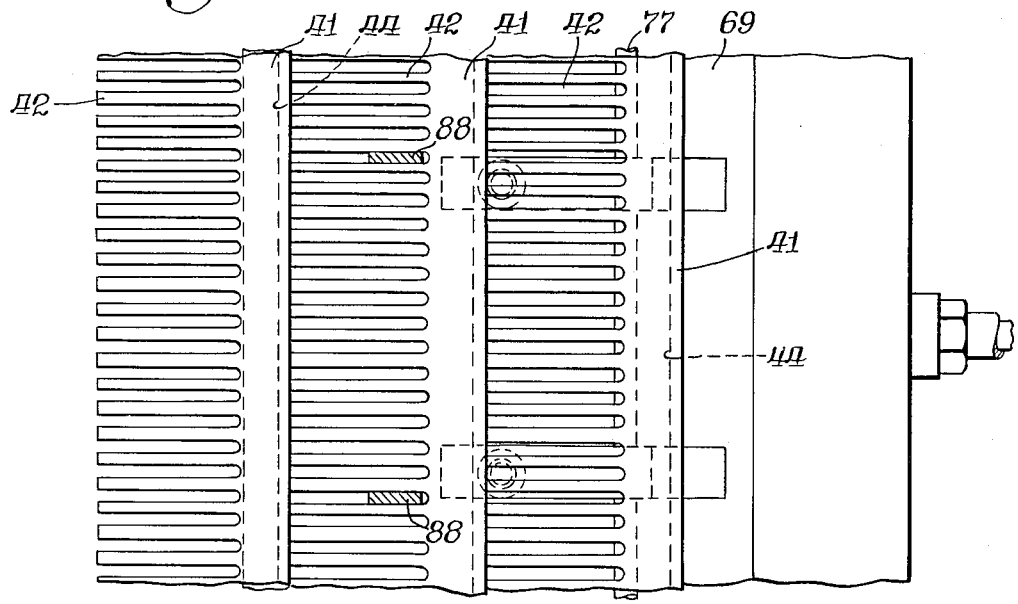
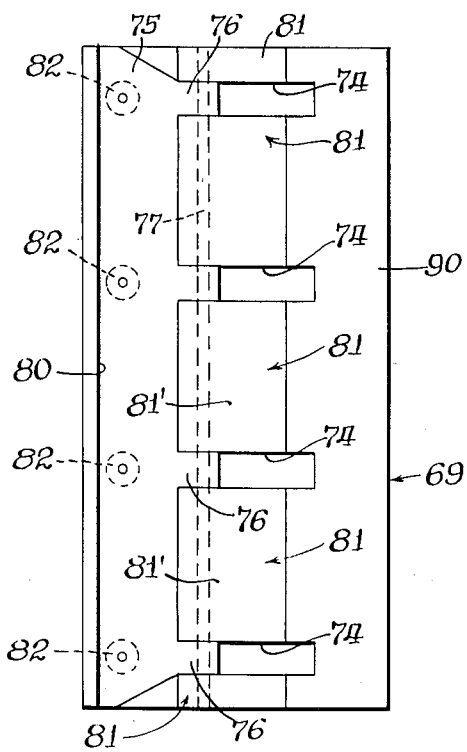
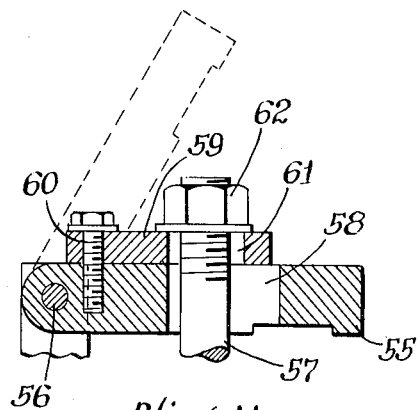
Inventors.
Roy W. Boyd
August Van Vooren
Harold Ruehl Feb. 21, 1956  R. W. BOYD ET AL  2,735,164
MACHINE FOR REMOVING SPACERS FROM RADIATOR CORES
Filed Sept. 29, 1951  6 Sheets-Sheet 6

Inventors.
Roy W. Boyd
August Van Vooren
Harold Ruehl

Paul O. Pippel
Atty

United States Patent Office 2,735,164
Patented Feb. 21, 1956

2,735,164

MACHINE FOR REMOVING SPACERS FROM RADIATOR CORES

Roy W. Boyd, Chicago, August Van Vooren, Evanston, and Harold Ruehl, Chicago, Ill., assignors to International Harvester Company, a corporation of New Jersey Application September 29, 1951, Serial No. 248,925

4 Claims. (Cl. 29—202)

This invention relates to a machine for withdrawing radiator fin spacing elements from the core of a radiator during the steps of assembling the same.

In applicants' co-pending application Serial No. 284,924, filed September 29, 1951, now Patent No. 2,688,178, issued September 7, 1954, a machine for assembling radiator cores is disclosed. This machine serves to cut radiator fin stock to length, and while so doing, the fins are simultaneously pierced and threaded over the vertical liquid carrying tubes which are normally a part of a radiator structure. As each fin is threaded over the tubes a spacer of a predetermined thickness is inserted automatically on top of the fin which is last placed into position. The radiator tubes are held in a removable magazine and when the radiator has been completely assembled it is removed with the magazine from the assembly machine. In this condition the radiator magazine contains the radiator core including all of the spacing elements which have been inserted in the core to properly space the radiator fins with respect to each other.

After the magazine has been removed from the assembly machine it is desirable, of course, to remove the radiator core and to empty the magazine for subsequent use. Before removing the radiator core from the magazine it is desirable, however, to first remove the spacing elements so that they also can be returned to the radiator assembly machine for subsequent reuse.

It is a prime object of this invention, therefore, to provide an improved machine which will quickly and efficiently remove fin spacers from the core of a radiator.

It is still another object to provide a machine for removing fin-spacing elements, the fin spacing elements being normally disposed between the fins of a radiator core which has been assembled in a removable magazine, the spacing elements having portions which are engaged by a spacer removing machine.

A still further object is to provide a machine for withdrawing radiator fin spacing elements, the machine including a table having an elevating means relatively movable with respect to the table, the elevating means being designed to support a radiator assembly magazine containing a radiator core filled with fin spacing elements which must be removed, and including a spacing element withdrawing mechanism which is positioned adjacent to the elevating means.

A still further object is to provide a machine for removing spacing elements from a radiator core, the machine including a reciprocating plunger having a hook element designed to move horizontally for engaging the spacing elements positioned within a radiator core, the plunger also being movable to position the removed spacers in a stacking container wherein the removed spacers are stacked in vertical relation.

These and further objects will become more readily apparent from a reading of the specification when taken in connection with the accompanying sheets of drawings. In the drawings:

Fig. 2 is a front view, in elevation, of a machine for removing spacer elements, the view being taken substantially along the line 2—2 of Fig. 1.

Fig. 3 is a sectional view in elevation, the view being taken substantially along the line 3—3 of Fig. 2.

Fig. 5 is a sectional view through a locking device the view being taken substantially along the line 5—5 of Fig. 2.

Fig. 9 is a fragmentary sectional view showing a plurality of spacer elements being removed from a radiator core, the view being taken substantially along the line 9—9 of Fig. 7.

Fig. 10 is a detailed plan view of a plunger having a withdrawal plate pivotally connected thereto.

Fig. 11 is a cross-sectional view through an attaching bracket for attaching radiator magazines to an elevating structure, the view being taken along the line 11—11 of Fig. 1.

Figure 1:
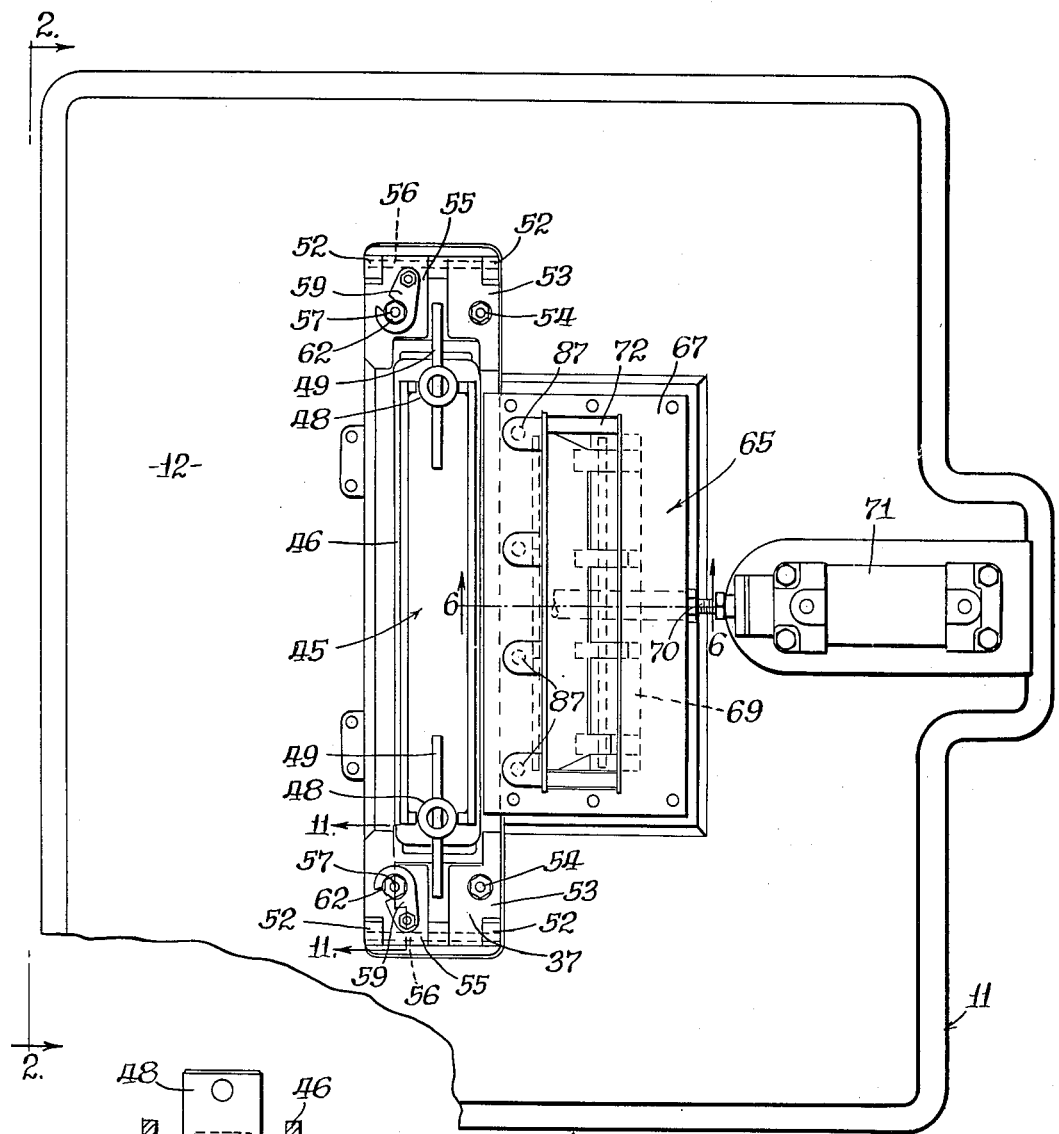
Fig. 1 is a plan view of a machine for removing fin spacing elements from a radiator core.

As best shown in Figs. 1, 2 and 3, a fin spacer removing machine is generally designated by the reference character 10. The spacer removing machine 10 includes a supporting structure 11 which has provided at its upper end a table 12. The table 12 is provided with a recess or opening 13 through which an elevating structure 14 generally can rise and descend. The elevator structure 14 comprises an upright support 15 which is provided at its upper end with an attaching plate 16. A rack bar 17 is connected to the upright support 15, the rack bar 17 being engaged by a pinion 18 which is journaled on a shaft 19 supported on the supporting structure 11. An intermediate gear 20 is in mesh with the pinion 18, the gear 20 being mounted on a shaft 21. A drive pinion 22 is mounted on a rotatable shaft 23, the pinion 22 being in engagement with the gear 20 for rotating the same. A hand wheel 24 is connected to the shaft 23.

As best shown in Fig. 5 a stop member 25 is in telescoping engagement with a sleeve 26 which is secure on the support 15. The stop member 25 is provided with threads 27 which are in threaded engagement with threads 28 provided in a sleeve 29. The sleeve 29, as indicated at 30, is rigidly secured to a portion of the supporting structure 11. A hand wheel 31 is, in turn, connected to the threaded rod 27 for rotating the same.

Figure 8:
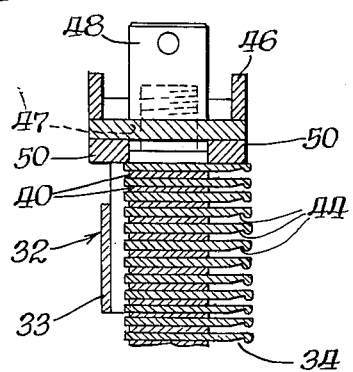
Fig. 8 is a cross-sectional view through a portion of a radiator core containing magazine, the view being taken substantially along the line 8—8 of Fig. 2.
Figure 12:
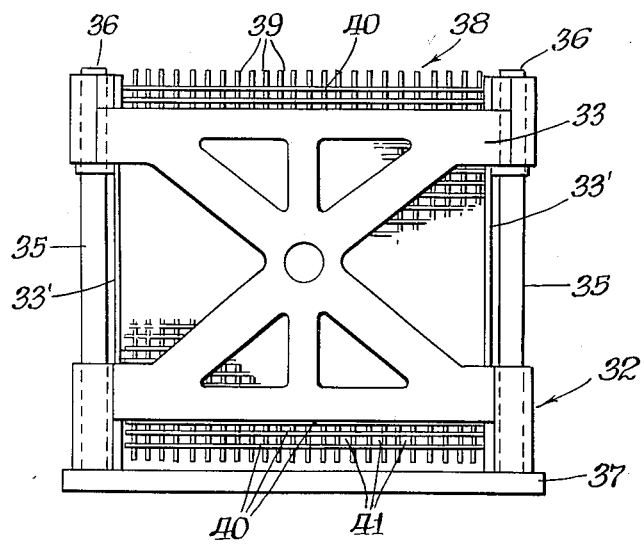
Fig. 12 is a side view in elevation of a radiator magazine showing a radiator core contained therein.
Figure 13:
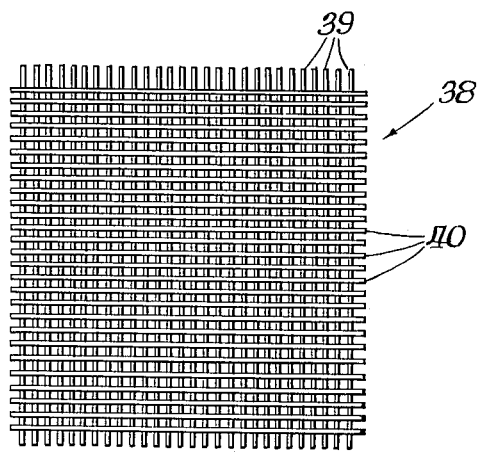
Fig. 13 is a side elevational view of a radiator core showing the core with its fin spacing elements removed as it appears after it has been removed from a radiator magazine.

A radiator magazine is generally designated by the reference character 32, the magazine 32 being best shown in Figs. 2, 8 and 12. The radiator magazine 32 includes a rear wall 33 which is suitably connected to side walls 33'. The radiator magazine is open on one side, as indicated at 34. Disposed on opposite sides of the side walls 33 are locking pins 35. These locking pins 35 are more fully described in applicants' co-pending application above mentioned and provide means whereby the radiator magazine may be securely locked on the table of a radiator assembly device. The locking pins 35 are provided at their uppermost ends with threads 36. An attaching plate 37 is provided at the lower end of the radiator magazine 32.

Figure 14:
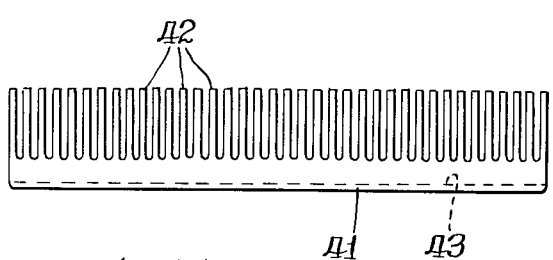
Fig. 14 is a plan view of a comb-shaped fin spacing element.
Figure 15:
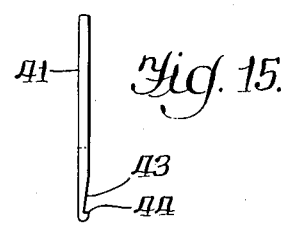
Fig. 15 is an enlarged end view in elevation of the comb shaped spacing element shown in Fig. 14.

As best shown in Fig. 12, a radiator 38 is positioned in assembled relation within the magazine 32. The radiator 38 consists of a plurality of upright tubes 39 which are assembled with transversely extending fins 40. In the radiator assembly machine application above indicated the fins are threaded over the upright tubes during the assembling operation and spacers 41 are positioned between each pair of fins for maintaining the proper distance between the fins. The spacers 41 are positioned in the assembled radiator core within the magazine 38, as best shown in Figs. 8 and 12. Each spacer 41, as shown in Fig. 14, includes a plurality of teeth 42, the spacers 41 generally being comb shaped. A recess 43 extending the length of the spacer 41 forms a hook 44, the purpose of which presently will become more apparent.

As shown in Figs. 1, 2 and 3, the upper ends of the magazine 38 when it is positioned in the spacer removing machine is provided with a retaining cap structure 45. The cap structure 45 includes a channel shaped bracket 46 which, as indicated in Figs. 1 and 8, is provided with openings 47 through which the upper ends of the locking pins 35 project. Socket nuts 48 are threaded over the threaded ends 36 of the locking pins 35 by means of levers 49 so that the channel shaped bracket 46 is rigidly supported over the top of the radiator magazine 38. The underneath side of the channel shaped bracket 46 is provided with transversely spaced bars 50 which extend the length of the bracket 46 and which lie on the top edges of the uppermost spacer element 41.

The attaching plate 16 of the elevating structure 14 is provided with oppositely disposed clamping brackets 51, as best shown in Figs. 1, 2 and 11. The attaching plate 16 is provided at opposite ends with upwardly extending hinge posts 52. Each bracket 51 comprises a stationary securing part 53 which is maintained in non-hinging relation by means of a fastener 54. It must be understood that the stationary parts 53 are so arranged that the ends of the attaching plate 37 of the radiator magazine 32 may be readily slid underneath the stationary parts whereupon the fastening means 54 can be tightened for securing end portions of the attaching plate 37. The brackets 51 also include hinge parts 55 which are hingedly connected to the posts 52 by means of hinge pins 56. A stud 57, as best shown in Fig. 2, extends through each attaching plate 16 and, as shown in Fig. 11, projects through an enlarged opening 58 which is provided in the hinge part 55. A locking latch 59 is pivotally connected to the bracket 55 by means of a fastener 60. The stud 57 also projects through an opening 61 provided in the latch 59 and a lock nut 62, securely tightened against the latch 59 and the bracket 55, will retain the bracket 55 in clamping engagement with an edge portion of the attaching plate 37.

Referring now to Figs. 1, 3, 6 and 7, a spacer withdrawing mechanism 65 is generally indicated. The mechanism 65 is mounted on a support 66. An upper plate 67 is positioned above the support 66 and provides a guideway 68 through which a plunger 69 is reciprocated. A piston rod 70 is connected to the plunger 69, the rod 70, in turn, being connected to a fluid pressure extensible device 71.

Figure 6:
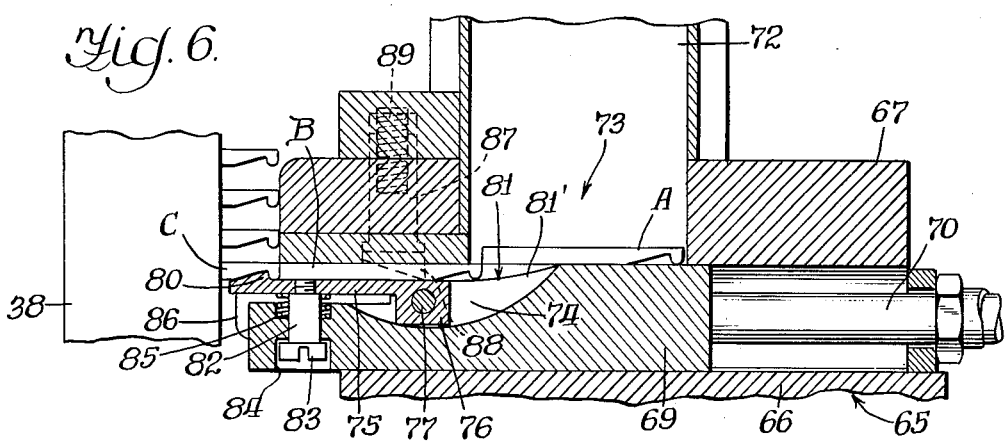
Fig. 6 is a cross-sectional view through a fin spacer withdrawing mechanism, the view being taken substantially along the line 6—6 of Fig. 1.
Figure 7:
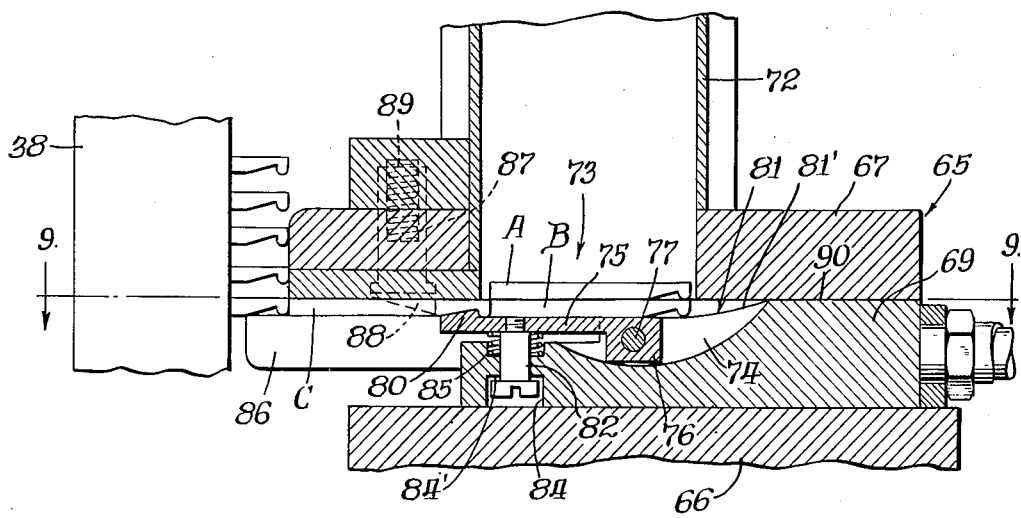
Fig. 7 is a sectional view similar to Fig. 6, the view showing a second operating position of a device for withdrawing fin spacing elements.
Figure 4:
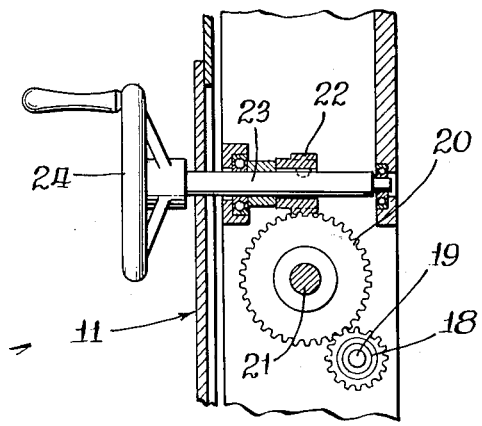
Fig. 4 is a sectional view through a drive mechanism for an elevating structure, the view being taken substantially along the line 4—4 of Fig. 2.

A spacer stocking container 72 is positioned on the plate 67, the container 72 being open at its lower end, as indicated at 73. As best shown in Figs. 6, 7 and 10, the plunger 69 is provided with a plurality of arcuate recesses 74. A withdrawal plate 75 has a plurality of hinge sections 76 which extend into the arcuate recesses 74 and are held in hinged relation with respect to the plunger 69 by means of a hinge pin 77. The withdrawal plate 75 is provided with a hook 80 which is adapted to engage the hook 44 of a spacer element 41 as best indicated in Figs. 6 and 7.

The plunger 69 is also provided with a plurality of adjacent arcuate depressions or recesses 81 which have considerably less depth than the recesses 74. The depressions 81, as best shown in Fig. 10, are positioned adjacent to the recesses 74.

Referring now to Figs. 6, 7 and 10, screw type studs 82 are provided with enlarged heads 83. The studs 82 are connected to the underneath side of the withdrawal plate 75. Enlarged bores 84 permit relative movement of the enlarged heads 83 with respect to shoulders 84' formed in the plunger 69. Springs 85 are threaded over the studs 82, the springs 85 urging the withdrawal plate 75 in an upward direction, upward movement of the studs 82 being limited by the engagement of the heads 83 with the shoulder 84'.

As indicated in Figs. 6 and 7, a stop bracket 86 projects outwardly from the upper plate 67. The purpose of this bracket will presently appear in the operation. A plurality of resilient fingers 87, as best shown in Figs. 1, 6 and 7, are horizontally spaced within the upper plate 67. The resilient fingers 87 include tip portions 88 which, as best shown in Fig. 9, may engage the spaces of the spacer comb 41 formed between the teeth 42. Springs 89 force the tip portions 88 downwardly into the position shown in Figs. 6 and 7, these tip portions 88 serving to prevent return movement of the fin spacers 41 when the plunger 69 is moved in a direction toward the magazine 38.

The operation

In preparing the machine 10 for operation, the hand wheel 24 is rotated whereupon the elevating structure 14 is moved in an upward direction until the attaching plate 16 is at the same level as the table 12. The operator thereupon takes and places a radiator magazine 32 on the attaching plate 16. The attaching plate 37 of the radiator magazine 32 is slid horizontally underneath the stationary parts 53 of the brackets 51. The hinge parts 55 are now moved from the dotted line position, shown in Fig. 11, over the stud 57 whereupon the end of the hinge part 55 clamps over the end of the attaching plate 37. The latch 59 is rotated into place and the nut 62 is tightened and each bracket 51 now securely clamps opposite edges of the attaching plate 37 to the plate 16 of the elevating structure 14. The retaining cap structure 45 has been securely locked in place over the top of the radiator magazine 32 and the socket nuts 48 have been securely tightened. In this position, of the elevating structure 15, the stop member 25 is in the telescopic position shown with respect to the sleeve 26. The stop element 25 thus prevents the elevating mechanism 14 from lowering during the time when the magazine 32 is securely attached to the attaching plate 16. When the radiator magazine has been attached to the elevating mechanism, the stop member 25 can be moved out of engagement with the sleeve 26. The elevating structure 15 will be held against lowering by the stop bracket 86 which now engages the lowermost of the spacer elements 41, as indicated in Figs. 6 and 7. It now can be seen that it is necessary to provide the retaining cap structure 45, since it, in effect, maintains the radiator core from being lifted from the magazine in view of the fact that the full weight of the magazine and the elevating structure 14 is carried by the particular spacer element which is engaged by the stop bracket 86.

The withdrawal mechanism 65 is now ready for operation and the extensible mechanism 71 is set into motion. The plunger 69 moves toward the magazine 32 and the withdrawal plate 75 has its hook portion 80 engaging the hook 44 of the lowermost of the spacer elements 41. The plunger 69 is now moved away from the magazine 32 and withdraws a spacer element 41 from the magazine. The spacer element 41 lies immediately underneath the resilient fingers 87, as indicated in Fig. 6. The portions 88 of the fingers 87, as shown in Fig. 9, project in between spaces formed by fingers 42 of the spacer elements 41. The spacer element 41, which is now disposed beneath the fingers 87, is held against return movement toward the magazine 32. The plunger is now again pushed toward the magazine 32, and the hook 80 of the withdrawal plate 75 again engages the hook portion 44 of the next spacer element 41. As the plunger 69 is again withdrawn from the magazine 32 the second spacer element 41 pushes the spacer element previously removed into position underneath the opening 73 of the container 72. The spacer element 41 which is now positioned immediately in line with the opening 73, is, of course, disposed below the container 72 and this spacer must now be shoved upwardly into the container.

As indicated in Fig. 10, the plunger 69 is provided with arcuate recesses 81 which terminate at one end in a flat surface 90 provided at the top side of the plunger 69. The plunger 69 now moves toward the magazine 32 and the spacer element 41, which is disposed immediately beneath the container 72, rides upwardly on the arcuate surfaces 81' formed along the bottom edges of the recesses 81 until the spacer element 41 is completely supported on the surface 90. Thus, as the plunger 69 is pushed toward the magazine 32, the arcuate edges 81' push the spacer element 41 upwardly and the flat surface 90 supports the spacer element 41, and any other spacer elements that might be supported in the container 72, from interfering with the free movement of the plunger 69. As each spacer element 41 is thus withdrawn, its retraction causes movement of the preceding spacer element from the position beneath the fingers 87 into the space below the container 72, whereupon upon the next succeeding operation the spacer element 41 is moved upwardly into stacking relation within the container 72. The manner of operation of the unit can be described in other words as follows:

Spacer element A is withdrawn from the magazine during the first retraction movement of the plunger 69. The spacer A is then positioned beneath the fingers 87, these fingers 87 preventing return of the spacer element A upon movement of the plunger 69 toward the magazine 32 when said plunger is moved into position for retracting spacer element B. Spacer element B is now withdrawn and as spacer element B is withdrawn it, in turn, pushes spacer element A into position beneath the container 72. The plunger 69 is again moved in a direction toward the magazine 32 whereupon the arcuate surfaces 81' push the spacer element A upwardly into the container 72. At this point spacer element B is positioned underneath the fingers 87. As indicated in Fig. 6, spacer element B has now been withdrawn and it, in turn, has moved spacer element B beneath the container 72 whereupon the said spacer element can be moved upwardly into the container 72 upon subsequent movement of the plunger 69 toward the radiator magazine 32.

As each spacer element 41 is withdrawn from the magazine, the elevating mechanism under the action of gravity will drop until the next spacer element is in position, the downward movement of the elevating mechanism and the magazine being limited by the stop 86 which engages the underneath side of the next spacer element to be removed. Thus, the elevating structure and the magazine drop, due to gravity, as each spacer element is removed.

When the last spacer element has thus been removed the elevating structure is positioned with the radiator magazine and core below the surface of the table 12. At this point the operator cranks the hand wheel 24 so that the elevating structure 14 moves back upwardly to a point where the attaching plate 16 is level with the upper surface of the table 12. He then actuates the hand wheel 31 to move the stop 25 back into telescoping engagement with respect to the sleeve 26 so that the elevating structure is locked in place against downward movement. The radiator magazine and core 38 can now be quickly removed. The spacer elements 41 have now all been stacked in the container 72 and they can be removed for subsequent reuse with a radiator assembly machine.

It can now be seen that an effective and efficient mechanism has been provided for removing fin spacing elements or combs from an assembled radiator core which is positioned within a magazine. The machine effectively and quickly removes the spacing elements without the need of constant supervision since the machine will function in an automatic manner after the magazine has been placed in position and the extensible device has been set in operation.

It can now be seen that the objects of the invention have been fully achieved and that changes and modifications can be made without departing from the spirit of the invention as disclosed, nor the scope thereof as defined in the appended claims.

What is claimed is:

1. A machine for removing fin spacers from radiator core assemblies comprising, a supporting structure, a table on said supporting structure, said table having a vertically extending opening, elevating structure movable through said opening, actuating means connected to said elevating structure and adapted to raise said elevating structure through said opening, clamping means on said elevating structure for removably locking a radiator magazine having an assembled radiator core including fin spacers to said elevating structure, the fin spacer being positioned in the magazine in stacked relation between the fins, a spacer withdrawing means positioned adjacent to the opening, said withdrawing means comprising a horizontally reciprocable plunger, means connected to said plunger for reciprocating the same, an arcuate recess formed in said plunger, an upright stacking container positioned above said recess, said stacking container being open at its lower end for receiving fin spacers, a withdrawal plate hingedly connected within the recess to said plunger, said plate having a hook portion adjacent one end, said hook portion being engageable with a hook on each fin spacer whereby upon reciprocation of said plunger a fin spacer is withdrawn from the magazine, a stop on said table engageable with each fin spacer prior to its withdrawal, said stop being arranged to limit the descent of said elevating structure through said opening whereby the succeeding spacer to be withdrawn is positioned in position adjacent the withdrawal plate, resilient means engageable with the spacers for limiting movement of the spacer to the direction of withdrawal and means adjacent the arcuate recess on said plunger engaging each spacer for successively moving said spacers upwardly into said stacking container after they have been withdrawn and during reciprocation of said plunger.

2. A machine for removing fin spacers from radiator core assemblies comprising, a supporting structure, a table on said supporting structure, said table having a vertically extending opening, elevating structure movable through said opening, actuating means connected to said elevating structure and adapted to raise said elevating structure through said opening, clamping means on said elevating structure for removably locking a radiator magazine having an assembled radiator core including fin spacers to said elevating structure, the fin spacer being positioned in the magazine in stacked relation between the fins, a spacer withdrawing means positioned adjacent to the opening, said withdrawing means comprising a horizontally reciprocable plunger, means connected to said plunger for reciprocating the same, an arcuate recess formed in said plunger, an upright stacking container positioned above said recess, said stacking container being open at its lower end for receiving fin spacers, a withdrawal plate hingedly connected within the recess to said plunger, said plate having a hook portion adjacent one end, said hook portion being engageable with a hook on each fin spaced whereby upon reciprocation of said plunger a fin spacer is withdrawn from the magazine, a stop on said table engageable with each fin spacer prior to its withdrawal, said stop being arranged to limit the descent of said elevating structure through said opening whereby the succeeding spacer to be withdrawn is positioned in position adjacent the withdrawal plate, limiting means engageable by the spacer for limiting movement of the spacer to the direction of withdrawal, and means adjacent the arcuate recess on said plunger engaging each spacer for successively moving said spacers upwardly into said stacking container after they have been withdrawn and during reciprocation of said plunger.

3. A machine for removing fin spacers from radiator core assemblies comprising, a supporting structure, a table on said supporting structure, elevating structure movable relative to said table, actuating means connected to said elevating structure and adapted to raise said elevating structure relative to said table, clamping means on said elevating structure for removably locking a radiator magazine having an assembled radiator core including fin spacers to said elevating structure, the fin spacer being positioned in the magazine in stacked relation between the fins, a spacer withdrawing means positioned on the table, said withdrawing means comprising a horizontally reciprocable plunger, means connected to said plunger for reciprocating the same, an upright stacking container positioned above said plunger, said stacking container being open at its lower end for receiving fin spacers, a withdrawal plate hingedly connected to said plunger, said plate having a hook portion adjacent one end, said hook portion being engageable with a hook on each fin spacer whereby upon reciprocation of said plunger a fin spacer is withdrawn from the magazine, limiting means engageable with the spacer for limiting movement of the same in the direction of withdrawal, and means on said plunger engaging each spacer for successively moving said spacers into said stacking container whereby the spacers are withdrawn and simultaneously stacked during reciprocation of said plunger.

4. A machine for removing fin spacers from radiator core assemblies comprising a supporting structure, a table on said supporting structure, elevating structure movable relative to said table, means on said elevating structure for removably securing an assembled radiator core having stacked fin spacers positioned thereon said elevating structure, a spacer withdrawing mechanism positioned adjacent to said elevating structure, said mechanism including a reciprocating plunger, a stacking container positioned on said table above said plunger, said container having an opening at its lower end, means for reciprocating said plunger relative to said opening, a withdrawal plate connected to said plunger for reciprocation therewith, said withdrawal plate being engageable with a spacer for horizontally withdrawing the spacer during movement of the plunger in a first direction and for moving said spacer in a second direction into position adjacent the opening of said stacking container, means engageable with said spacers for limiting the horizontal movement of the spacer to the direction of withdrawal, and means on said plunger for engaging the spacer positioned adjacent the opening for moving the same into said stacking container during movement of the plunger in the first direction.

References Cited in the file of this patent

UNITED STATES PATENTS

| | | |
|---|---|---|
| 822,214 | Marshall | May 29, 1906 |
| 1,105,641 | Feaster | Aug. 4, 1914 |
| 1,615,272 | Hawkins et al. | Jan. 25, 1927 |
| 1,725,990 | Mason | Aug. 27, 1929 |
| 1,759,501 | Frederick | May 20, 1930 |
| 1,966,878 | Bluzat | July 17, 1934 |
| 2,258,618 | Larkin | Oct. 14, 1941 |
| 2,264,738 | Blann | Dec. 2, 1941 |